US008938094B1

United States Patent
Kehl et al.

(10) Patent No.: US 8,938,094 B1
(45) Date of Patent: Jan. 20, 2015

(54) GENERATING A ROAD NETWORK BASED ON SATELLITE IMAGERY

(75) Inventors: Roland Kehl, Dubendorf (CH); Matthias Heiler, Zurich (CH); Gokhan Hasan Bakir, Zurich (CH)

(73) Assignee: Google Inc., Mountain View, CA (US)

( * ) Notice: Subject to any disclaimer, the term of this patent is extended or adjusted under 35 U.S.C. 154(b) by 424 days.

(21) Appl. No.: 13/446,948

(22) Filed: Apr. 13, 2012

(51) Int. Cl.
*G06K 9/00* (2006.01)

(52) U.S. Cl.
USPC ........... 382/103; 382/100; 382/113; 382/181; 382/190; 348/143; 348/144; 348/148

(58) Field of Classification Search
None
See application file for complete search history.

(56) References Cited

U.S. PATENT DOCUMENTS

| | | | | |
|---|---|---|---|---|
| 7,359,555 | B2 * | 4/2008 | Porikli et al. | 382/204 |
| 8,731,305 | B1 * | 5/2014 | Mantri | 382/197 |
| 2004/0034473 | A1 * | 2/2004 | Kim et al. | 702/5 |
| 2005/0100220 | A1 * | 5/2005 | Keaton et al. | 382/191 |
| 2005/0283310 | A1 * | 12/2005 | Santamaria et al. | 701/209 |
| 2006/0078205 | A1 * | 4/2006 | Porikli et al. | 382/204 |
| 2007/0014488 | A1 * | 1/2007 | Chen et al. | 382/294 |
| 2010/0034483 | A1 * | 2/2010 | Giuffrida et al. | 382/284 |
| 2010/0265267 | A1 * | 10/2010 | Schaepe et al. | 345/619 |
| 2011/0280453 | A1 * | 11/2011 | Chen et al. | 382/113 |

OTHER PUBLICATIONS

Gruen et al.,Road extraction from aerial and satellite images by dynamic programming, Aug. 1995, vol. 50, Issue 4, , pp. 11-20.*
Geman et al., An Active Testing Model for Tracking Roads in Satellite Images, 1996, Pattern Analysis and Machine Intelligence, IEEE Transactions on , vol. 18, pp. 1-14.*
Laptev et al., "Automatic extraction of roads from aerial images based on scale space and snakes," 2000, Mach. Vis. and Appl., vol. 12, pp. 23-31.*

* cited by examiner

*Primary Examiner* — Matthew Bella
*Assistant Examiner* — Jason Heidemann
(74) *Attorney, Agent, or Firm* — Dority & Manning, P.A.

(57) ABSTRACT

A system and method for generating a road network based on satellite imagery. Plural pixels corresponding to satellite imagery of a region are obtained. For each of the plural pixels, a probability value corresponding to the probability that the pixel belongs within the road network is calculated. A grayscale image is formed based on the calculated probability values. Plural curves are produced based on the grayscale image, wherein the producing of each curve includes positioning a shape on the grayscale image so that an average intensity of the grayscale image covered by the shape exceeds a preset threshold, moving the shape about the grayscale image while the average intensity is maintained, and tracking the movement of the shape to produce the curve. A planar-connected graph is generated by connecting at least portions of the plural curves. The planar-connected graph corresponds to the road network.

21 Claims, 6 Drawing Sheets

GENERATING A ROAD NETWORK BASED ON SATELLITE IMAGERY

BACKGROUND

The present disclosure generally relates to image processing, and, in particular, to generating a road network based on satellite imagery.

Satellite imagery consists of photographs of the earth. Satellite imagery can be processed to construct a road network from the image. In this regard, road network attributes such as a graph of connections between roads and an indication of road width may be useful, for example, in web mapping service applications. However, it may be difficult to automatically construct road networks based on captured satellite image data.

SUMMARY

The disclosed subject matter relates to a machine-implemented method for generating a road network based on satellite imagery. The method comprises obtaining plural pixels corresponding to satellite imagery of a region, calculating, for each of the plural pixels, a probability value corresponding to the probability that the pixel belongs within the road network, and forming a grayscale image based on the calculated probability values. The method further comprises producing plural curves based on the grayscale image, wherein the producing of each curve comprises positioning a shape on the grayscale image so that an average intensity of the grayscale image covered by the shape exceeds a preset threshold, moving the shape about the grayscale image while the average intensity is maintained, and tracking the movement of the shape to produce the curve. In addition, the method comprises generating a planar-connected graph by connecting at least portions of the plural curves, wherein the planar-connected graph corresponds to the road network.

The disclosed subject matter further relates to a system for generating a road network based on satellite imagery, the system comprising one or more processors and a machine-readable medium comprising instructions stored therein, which when executed by the processors, cause the processors to perform operations comprising obtaining plural pixels corresponding to satellite imagery of a region, calculating, for each of the plural pixels, a probability value corresponding to the probability that the pixel belongs within the road network, and forming a grayscale image based on the calculated probability values. The operations further comprise producing plural curves based on the grayscale image, wherein the producing of each curve comprises positioning a shape on the grayscale image so that the average intensity of the grayscale image covered by the shape is maximized, moving the shape about the grayscale image while the average intensity is maintained, and tracking the movement of the shape to produce the curve. In addition, the operations comprise generating a planar-connected graph by connecting at least portions of the plural curves, wherein the planar-connected graph corresponds to the road network.

The disclosed subject matter also relates to a machine-readable medium comprising instructions stored therein, which when executed by a system, cause the system to perform operations comprising obtaining plural pixels corresponding to satellite imagery of a region, calculating, for each of the plural pixels, a probability value corresponding to the probability that the pixel belongs within the road network, and forming a grayscale image based on the calculated probability values. The operations further comprise producing plural curves based on the grayscale image, wherein the producing of each curve comprises positioning a rectangle on the grayscale image so that an average intensity of the grayscale image covered by the rectangle exceeds a preset threshold, moving the rectangle about the grayscale image while the average intensity is maintained, tracking the movement of the rectangle to produce the curve, and blacking out the tracked movement of the rectangle corresponding to the curve within the grayscale image. In addition, the operations comprise generating a planar-connected graph by connecting at least portions of the plural curves, wherein the planar-connected graph corresponds to the road network.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The disclosed subject matter describes systems and techniques for generating a road network based on satellite imagery. Plural pixels corresponding to satellite imagery of a region are obtained. For each of the plural pixels, a probability value corresponding to the probability that the pixel belongs within the road network is calculated. A grayscale image is formed based on the calculated probability values. Plural curves are produced based on the grayscale image. Each of the plural curves is produced by positioning a shape on the grayscale image so that an average intensity of the grayscale image covered by the shape exceeds a preset threshold, moving the shape about the grayscale image while the average intensity is maintained, and tracking the movement of the shape to produce the curve. A planar-connected graph is generated by connecting at least portions of the plural curves. The planar-connected graph corresponds to the road network.

In producing each curve, the shape can be a rectangle which is continuously repositioned along its length to maintain a maximized average intensity. After a curve is computed, it is possible to omit the curve from consideration if it does not meet certain quality measures (e.g., self-intersecting). When a curve is determined, it is possible to black out the curve from the grayscale image, so as to avoid calculating duplicate curves.

Figure 1:
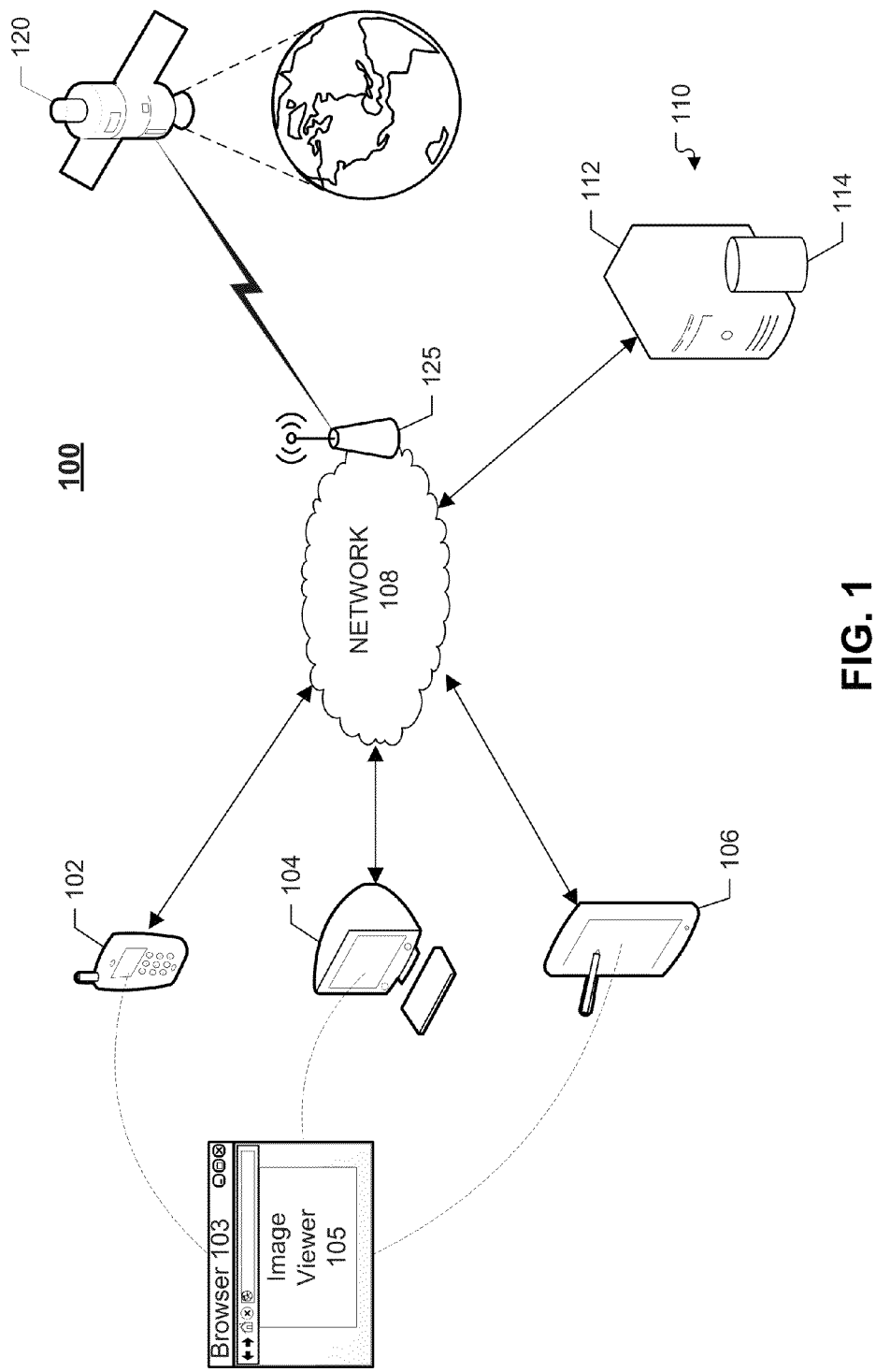
FIG. 1 illustrates an example distributed network environment which can provide for generating road networks based on satellite imagery.

FIG. 1 illustrates an example distributed network environment 100 which can provide for generating road networks based on satellite imagery. Although network environment 100 is described with reference to satellite images, it should be noted that embodiments are not intended to be limited thereto, and that the techniques for generating road networks as described herein may be applied to other types of images.

As shown in the example of FIG. 1, network environment 100 includes computing devices 102, 104 and 106, a computing system 110, a satellite 120, and a satellite base station 125. Computing devices 102 to 106 and computing system 110 can communicate with each other through a network 108. Computing system 110 can include one or more computing devices 112 (e.g., one or more servers) and one or more computer-readable data storage devices 114 (e.g., one or more databases).

Each of computing devices 102, 104 and 106 may represent various forms of processing devices. Example processing devices can include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any these data processing devices or other data processing devices. Computing devices 102 to 106 and 112 may be provided access to and/or receive application software executed and/or stored on any of the other computing systems 102 to 106 and 112. Computing device 112 can represent various forms of servers including, but not limited to a web server, an application server, a proxy server, a network server, or a server farm.

In some aspects, the computing devices may communicate wirelessly through a communication interface (not shown), which may include digital signal processing circuitry where necessary. The communication interface may provide for communications under various modes or protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, such as using a Bluetooth, WiFi, or other such transceiver.

In some aspects, system 100 can be a distributed client/server system that spans one or more networks such as network 108. Network 108 can be a large computer network, such as a local area network (LAN), wide area network (WAN), the Internet, a cellular network, or a combination thereof connecting any number of mobile clients, fixed clients, and servers. In some aspects, each client (e.g., computing devices 102, 104, and 106) can communicate with servers (e.g., computing device 112) via a virtual private network (VPN), Secure Shell (SSH) tunnel, or other secure network connection. In some aspects, network 108 may further include a corporate network (e.g., intranet) and one or more wireless access points.

In an example, each of computing devices 102, 104, and 106 executes a browser 103 including an image viewer 105. Browser 103 and image viewer 105 may be implemented using any type of computing device. Such computing device can include, but is not limited to, a personal computer, mobile device such as a mobile phone or tablet computer, workstation, embedded system, game console, television, set-top box, or any other computing device. Further, a computing device can include, but is not limited to, a device having a processor and memory for executing and storing instructions. Software may include one or more applications and an operating system. Hardware can include, but is not limited to, a processor, memory and graphical user interface display. The computing device may also have multiple processors and multiple shared or separate memory components. Further, it should be noted that image viewer 105 may be implemented as a standalone application, or it may be executed within browser 103. For example, image viewer 105 may be executed as a script, plug-in or program extension within browser 103.

In an example, image viewer 105 executing at any of devices 102, 104, or 106 requests configuration information from one or more servers 112 of computing system 110. For example, such configuration information may include metadata corresponding to an image or other digital content to be loaded for image viewer 105. In an embodiment, the configuration information is presented in a form such as the Extensible Markup Language (XML). Image viewer 105 retrieves image data for the image, for example, in the form of images or in the form of image tiles. For example, such image data may include the configuration information in a relevant file format.

The configuration information and image data can be used by the image viewer at computing devices 102, 104, and 106 to generate a visual representation of the image and any additional user interface elements. In addition, such a visual representation and additional user interface elements may be presented to a user on a display of the respective computing device. Such a display can be any type of electronic display for viewing images or can be any type of rendering device adapted to view images (e.g., three-dimensional images). As a user interacts with an input device to manipulate the visual representation of the image, image viewer updates the visual representation and proceeds to download additional configuration information and images as needed.

In an embodiment, image viewer 105 is integrated with a mapping service provided by computing system 110 and made accessible to a user of computing device 102, 104, or 106 via an interface of browser 103. For example, such a mapping service may be accessible via a graphical user interface (GUI) provided in browser 103. Further, such a GUI may include functions enabling the user to manipulate a position and orientation of a virtual camera in order to view portions of a geographic area corresponding to a digital map from different perspectives. In an example, the GUI may be presented as a map viewer integrating image viewer 105 within browser 103. In an embodiment, such a mapping service displays a visual representation of a map, e.g., as a viewport for displaying a grid of map tiles.

The mapping service may be implemented using any combination of markup language and scripting elements, e.g. using HTML and Javascript. As the viewport is moved (e.g., based on user input at computing device 102, 104, or 106), the mapping service may request additional map tiles from server(s) 112 as may be necessary, for example, when the requested map tiles have not already been cached in a local memory of the user device. Notably, the server(s) which serve the map tiles can be the same or different server(s) from the server(s) which serve image data or the other data involved herein.

In an embodiment, the visual representation of the map includes a representation of an aerial satellite image depicting a real-world scene comprising various objects (e.g., roads, mountains, landmarks, buildings or other structures, etc.) corresponding to a scene of a geographic area as captured by a satellite 120. For example, the images captured by satellite 120 may be representations of contiguous portions or strips of a geographic region, which are segmented by satellite 120 into different sections of a particular size and shape (e.g., equally-sized rectangular sections). Image data captured by satellite 120 may be relayed, for example, to an Earth base station 125 using a data link for communication between satellite 120 and base station 125. For example, images captured by satellite 120 initially may be in the form of raw image data and stored as raster data files. As such, the raw image data received at base station 125 may be processed and formatted into an appropriate image file to be stored in a data repository along with any relevant metadata.

Accordingly, images displayed using image viewer 105 may include aerial satellite images of different geographic regions on the map based on additional processing of such image files for purposes of the map service. For example, digital satellite images captured by satellite 120 may be processed (e.g., by server(s) 112) and stored at computing system 110 (e.g., database(s) 114) for later retrieval and transmission to any of computing device 102, 104 or 106 over network 108. In an example, image viewer 105 interfaces with computing system 110 in order to coordinate the operation of user interface elements for the mapping service. For example, image viewer 105 and the mapping service may operate together so as to allow the user to interact with either image viewer 105 or the mapping service in order to change the user's virtual location or views displayed on the map as provided by the mapping service. Further, any detected user interaction may cause a change in location or orientation to be reflected in the visual representation of the map or satellite imagery corresponding to a particular geographic location as displayed in image viewer 105 or in another content area provided by the mapping service or both.

As will be described in further detail below, the additional processing of the images at computing system 110 can include generating road networks based on digital satellite images captured by satellite 120.

Figure 2:
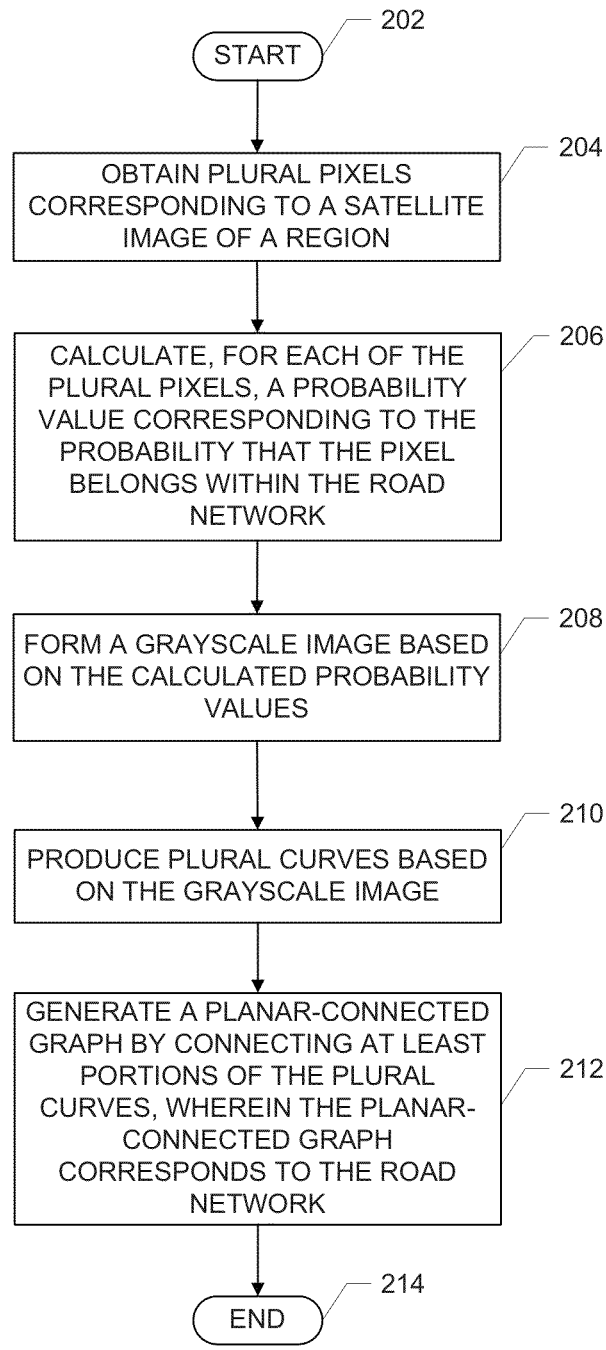
FIG. 2 illustrates an example process by which a road network is generated based on satellite imagery.

FIG. 2 illustrates an example process by which a road network is generated based on satellite imagery. Following start block 202, plural pixels corresponding to satellite imagery of a region are obtained at step 204. At step 206, for each of the plural pixels, a probability value corresponding to the probability that the pixel belongs within the road network is calculated. At step 208, a grayscale image is formed based on the calculated probability values.

At step 210, plural curves are produced based on the grayscale image. The producing of each curve includes positioning a shape on the grayscale image so that an average intensity of the grayscale image covered by the shape exceeds a preset threshold, moving the shape about the grayscale image while the average intensity is maintained, and tracking the movement of the shape to produce the curve.

The shape can be a rectangle. The positioning can include positioning the shape on the grayscale image so that an average intensity of the grayscale image covered by the shape is maximized. The producing of each curve can further include blacking out the tracked movement of the shape corresponding to the curve within the grayscale image.

At step 212, a planar-connected graph is generated by connecting at least portions of the plural curves, wherein the planar-connected graph corresponds to the road network. The planar-connected graph can be maintained within a spatial database which defines the geometries for the plural curves. The generating can include, for a curve within the plural curves, determining if an endpoint of the curve is within a predetermined distance of an edge of another curve within the planar-connected graph, based on the geometries defined within the spatial database. If it is determined that the endpoint is within the predetermined distance to the edge, the curve can be connected to the edge, and the connection can be stored in the spatial database.

The generating can also include, for a curve within the plural curves, determining if the curve intersects another curve within the planar-connected graph, based on the geometries defined within the spatial database. A Manhattan distance calculation can be performed using the curve and the other curve to determine if the curves intersect. If it is determined that the curve intersects the other curve, the curve can be split at a point corresponding to the intersection, and the split can be stored in the spatial database. If it is determined that the curve does not intersect the other curve, the curve can be stored in the spatial database.

The planar-connected graph can correspond to a first region, and the planar-connected graph can be connected with another planar-connected graph corresponding to a second region which is different from the first region.

Figure 3B:
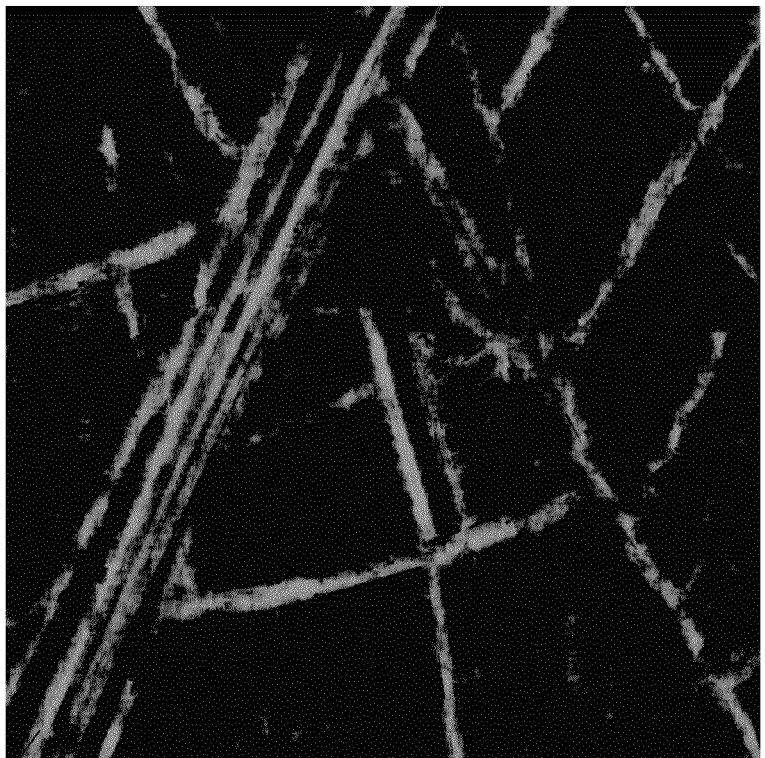
FIGS. 3A and 3B illustrate an example of a grayscale image formed from satellite imagery, based on probabilities that pixels belong within a road network.
Figure 3A:

FIGS. 3A and 3B illustrate an example of a grayscale image formed from satellite imagery, based on probabilities that pixels belong within a road network. More specifically, FIG. 3A represents satellite imagery of a region, and FIG. 3B represents a grayscale image of that region. The grayscale image depicts the probabilities of pixels belonging to a road network.

The grayscale image of FIG. 3B can be generated using a set of classifiers obtained from training sets, where each training set is specific to a particular region. For example, given satellite imagery, the image can be divided into multiple partitions, with each partition including pixels which are similar in appearance. In one example, pixels corresponding to a river can be grouped into a partition for rivers, pixels corresponding to soil can be grouped into a partition for soil, and pixels corresponding to houses can be grouped into a partition for houses.

Thus, training sets can be obtained for each partition. Each training set can include multiple pairs of image samples for a particular partition, with each pair including first and second elements. The first element of the pair can include plain image data (e.g., satellite image data). The second element of the pair can include black and white image data, with the black image data representing non-roads, and the white image data representing roads.

Next, a classifier can be trained for each partition, using the training set for that partition. For example, a classifier for a "river" partition can be trained using the multiple pairs of image samples within the training set for the river partition. By training a classifier for each partition, a set of classifiers is obtained.

The set of classifiers can then be applied to new satellite imagery corresponding to a target region, for example, to generate a grayscale image (e.g., FIG. 3B). As noted, each classifier within the set of classifiers is specialized for a particular type of partition (e.g., rivers, soil, houses). Thus, a target region can also be divided into multiple partitions, with each partition including pixels similar in appearance. It should be noted that the manner for partitioning the target region is the same as, or similar to, the manner for partitioning the training sets.

Once the target region is divided into partitions, each partition of the target region can be assigned to a corresponding training partition (e.g., by using a nearest neighbor algorithm). After each partition in the target region has been assigned to a training partition, probabilities of road networks within the target partitions can be determined by applying the classifier for the respective training partitions. In example aspects, a probability matrix can be formed to store the probabilities of road networks, and the probabilities can be encoded as a grayscale image (e.g., FIG. 3B).

As can be seen in FIG. 3B, the lighter pixels (e.g., pixels with higher intensity) are more likely to correspond to a road network, and the darker pixels (e.g., pixels with lower intensity) are more likely to correspond to areas outside of the road network. For example, road 302a in FIG. 3A can correspond to a segment 302b in FIG. 3B, where segment 302b has higher intensity than pixels which do not correspond to a road.

Figure 4B:
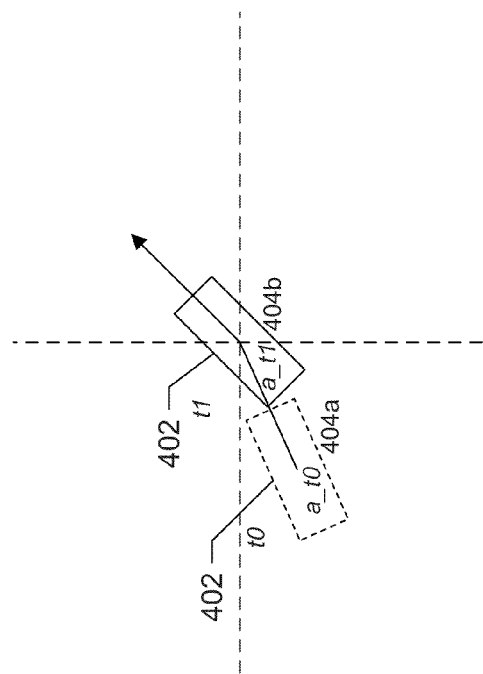
FIGS. 4A and 4B illustrate an example of a curve generation algorithm that can be applied to a grayscale image to generate plural curves.
Figure 4A:
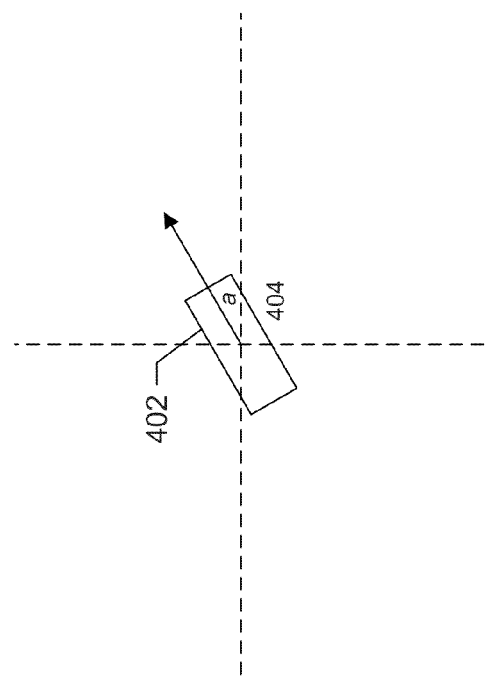

FIGS. 4A and 4B illustrate an example of a curve generation algorithm that can be applied to a grayscale image to generate plural curves. The grayscale image represents probabilities that pixels belong within a road network. The grayscale image can be encoded based on probability matrix which contains the probabilities, as discussed above with reference to FIGS. 3A and 3B. In this regard, it is possible to use an integral image representation of the probability matrix for the grayscale image.

A rectangle 402 with a position 404 can be positioned within the grayscale image and maneuvered such that the average intensity under rectangle 402 is maximized. In an initialization phase, a high probability location can be determined based on a pixel intensity exceeding a predetermined threshold within the grayscale image. This can assist in ensuring that a curve starts on a well-distinguished road segment.

Once the rectangle 402 has been appropriately placed on the grayscale image, the rectangle 402 can be maneuvered in the length-direction, to determine a new position corresponding to a high probability location. As can be seen in FIG. 4B, the rectangle 402 can be repositioned from a first position 404a to a second position 404b. The rectangle 402 can be repeatedly repositioned while the average intensity of the grayscale image covered by the rectangle is maximized, to produce a curve. The curve can end once the rectangle can no longer be repositioned to maintain the appropriate intensity. In an example aspect, the repeated repositioning while the average intensity of the grayscale image covered by the rectangle is maximized can correspond to the equation:

$$\arg\max_{x,y,a} \int P(\text{road} \,|\, x, y, d, a) > a_0 \qquad \text{Equation (1)}$$

In equation (1), P is the probability that the area covered by the rectangle having a width d (e.g., corresponding to road width) and a predefined length (e.g., 2d) located at image coordinates x and y with an orientation a corresponds to the road.

After a curve is computed, it is possible to accept or reject the curve based on certain quality measurements. For example, preset thresholds can be set for average intensity, length of the curve, and noise, for determining whether to accept or reject a candidate curve. In addition, shape characteristics of the curve can be analyzed in determining whether to reject a curve. For example, a curve which self-intersects may be rejected.

If a curve is accepted, the curve can be returned and the trace of the curve can be removed from the grayscale image (e.g., by blacking out the trace), so that the same curve will not be returned again. Once a candidate curve has been accepted or rejected, a new starting point can be repeatedly set for the rectangle within the grayscale image, to determine new curves. In this manner, the curve generation algorithm can generate plural curves within the grayscale image.

Figure 5:
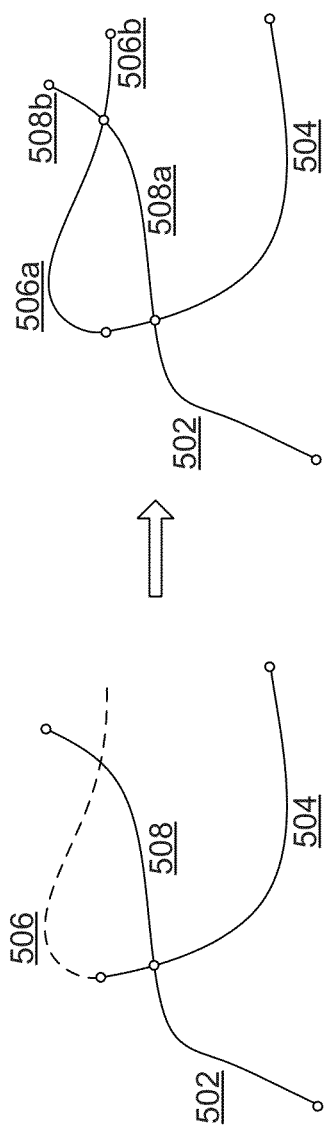
FIG. 5 illustrates an example of a planar graph curve connection algorithm that can be applied to plural curves, to generate a planar-connected graph corresponding to a road network.

FIG. 5 illustrates an example of a planar graph curve connection algorithm that can be applied to plural curves, to generate a planar-connected graph corresponding to a road network. More particularly, a planar-connected graph can be generated from the set of curves as extracted from the curve generation algorithm described above with reference to FIGS. 4A and 4B. This planar-connected graph can correspond to a road network.

The planar-connected graph can be maintained within a spatial database stored in memory to define the geometries for the plural curves. The planar graph curve connection algorithm can operate in a streaming manner, by evaluating curves one at a time and maintaining the network in memory.

The generating can include, for a curve within the plural curves, determining if an endpoint of the curve is within a predetermined distance of an edge of another curve within the planar-connected graph, based on the geometries defined within the spatial database. If it is determined that the endpoint is within the predetermined distance to the edge, the curve can be connected to the edge, a split can be formed, and the connection can be stored in the spatial database.

The generating can also include, for a curve within the plural curves, determining if the curve intersects another curve within the planar-connected graph, based on the geometries defined within the spatial database. For example, a Manhattan distance calculation using the curve and the other curve can be performed to determine if the curves intersect. Curves that do not intersect but are within a preset intersection threshold can be considered as intersecting.

If it is determined that the curves intersect, the curves can be split at a point corresponding to the intersection, and the split can be stored in the spatial database. As can be seen in FIG. 5, segments 502, 504 and 508 correspond to roads (or portions of roads) within the planar-connected graph. Segment 506 can correspond to a new curve to be included in the planar-connected graph. When segment 506 is connected to segment 504, a split can occur due to an intersection between segment 506 and segment 508. Thus, segment 506 can be split into segments 506a and 506b, and segment 508 can be split into segment 508a and 508b.

Different types of splits can be formed, based on whether the end of a curve is connected to an existing edge of the planar-connected graph, or if an intersection occurs between two curves. Since the split points for these types of splits differ, the spatial database can also store whether a split is due to a curve connecting to an edge, or due to an intersection of curves.

If it is determined that a curve does not intersect another curve, the curve can be stored in the spatial database. It should be noted that even if curves do not intersect, it is possible that the curves may eventually be merged within the planar-connected graph, since curves within a predetermined connection distance may be connected.

Thus, the planar graph curve connection algorithm can be used to generate a planar-connected graph for a region. It is possible to apply the planar graph curve connection algorithm to multiple regions, to generate multiple planar-connected graphs. The multiple planar-connected graphs can in turn be connected, by matching curves and angles along the edges of the planar-connected graphs.

As noted above, the planar-connected graph can correspond to one or more road networks within a map. The planar-connected graph can be used in web mapping service applications. For example, the planar-connected graph can be overlaid on an image (e.g., satellite imagery, a map-view image), and can be used to assist in web mapping (e.g., for locating businesses and providing directions to businesses).

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 6:
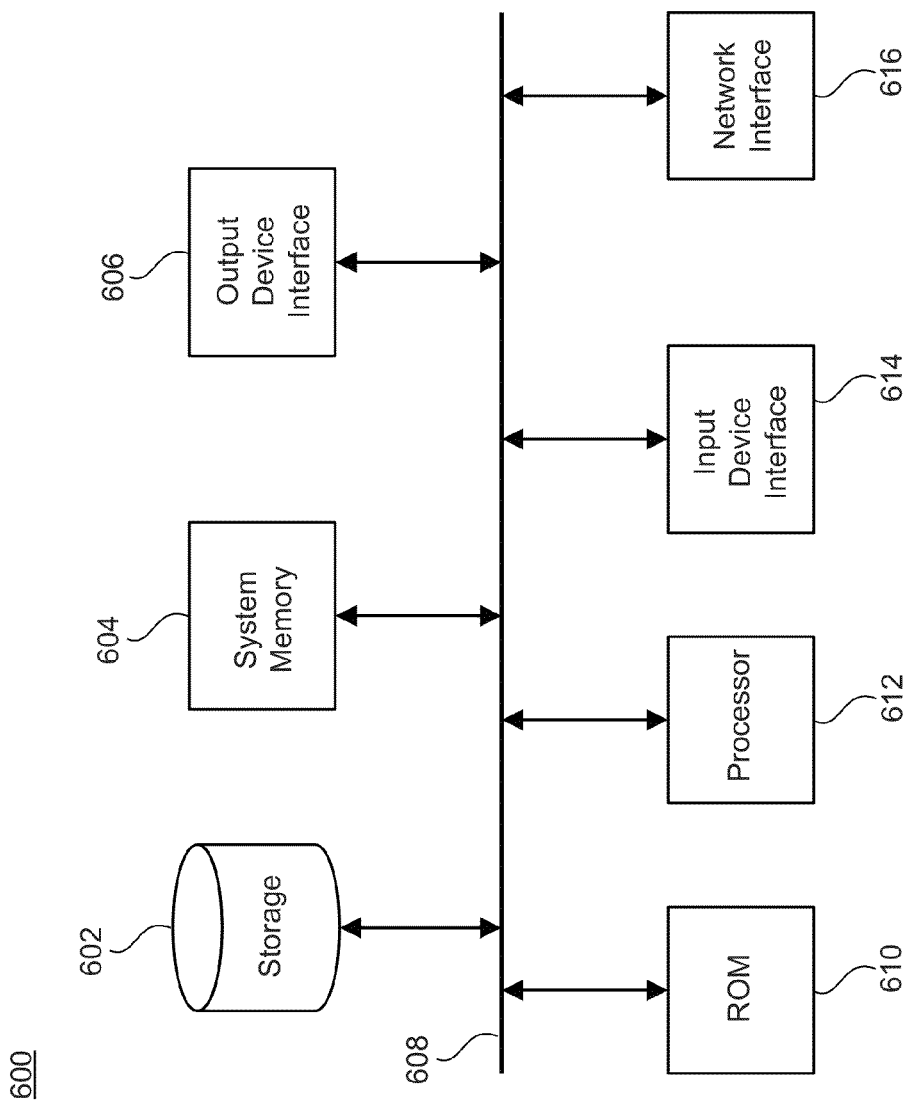
FIG. 6 conceptually illustrates an electronic system with which some implementations of the subject technology are implemented.

FIG. 6 conceptually illustrates an electronic system with which some implementations of the subject technology are implemented. Electronic system 600 can be a computer, phone, PDA, or any other sort of electronic device. Such an electronic system includes various types of computer readable media and interfaces for various other types of computer readable media. Electronic system 600 includes a bus 608, processing unit(s) 612, a system memory 604, a read-only memory (ROM) 610, a permanent storage device 602, an input device interface 614, an output device interface 606, and a network interface 616.

Bus 608 collectively represents all system, peripheral, and chipset buses that communicatively connect the numerous internal devices of electronic system 600. For instance, bus 608 communicatively connects processing unit(s) 612 with ROM 610, system memory 604, and permanent storage device 602.

From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 612 and other modules of the electronic system. Permanent storage device 602, on the other hand, is a read-and-write memory device. This device is a non-volatile memory unit that stores instructions and data even when electronic system 600 is off. Some implementations of the subject disclosure use a mass-storage device (such as a magnetic or optical disk and its corresponding disk drive) as permanent storage device 602.

Other implementations use a removable storage device (such as a floppy disk, flash drive, and its corresponding disk drive) as permanent storage device 602. Like permanent storage device 602, system memory 604 is a read-and-write memory device. However, unlike storage device 602, system memory 604 is a volatile read-and-write memory, such a random access memory. System memory 604 stores some of the instructions and data that the processor needs at runtime. In some implementations, the processes of the subject disclosure are stored in system memory 604, permanent storage device 602, and/or ROM 610. For example, the various memory units include instructions for processing images (e.g., satellite imagery) in accordance with some implementations. From these various memory units, processing unit(s) 612 retrieves instructions to execute and data to process in order to execute the processes of some implementations.

Bus 608 also connects to input and output device interfaces 614 and 606. Input device interface 614 enables the user to communicate information and select commands to the electronic system. Input devices used with input device interface 614 include, for example, alphanumeric keyboards and pointing devices (also called "cursor control devices"). Output device interfaces 606 enables, for example, the display of images generated by the electronic system 600. Output devices used with output device interface 606 include, for example, printers and display devices, such as cathode ray tubes (CRT) or liquid crystal displays (LCD). Some implementations include devices such as a touchscreen that functions as both input and output devices.

Finally, as shown in FIG. 6, bus 608 also couples electronic system 600 to a network (not shown) through a network interface 616. In this manner, the computer can be a part of a network of computers (such as a local area network ("LAN"), a wide area network ("WAN"), or an Intranet, or a network of networks, such as the Internet. Any or all components of electronic system 600 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user, for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A machine-implemented method for generating a road network based on satellite imagery, the method comprising:
    obtaining plural pixels corresponding to satellite imagery of a region;
    calculating, for each of the plural pixels, a probability value corresponding to the probability that the pixel belongs within the road network;
    forming a grayscale image based on the calculated probability values;
    producing plural curves based on the grayscale image, wherein the producing of each curve comprises:
        positioning a shape on the grayscale image so that an average intensity of the grayscale image covered by the shape exceeds a preset threshold;
        moving the shape about the grayscale image while the average intensity is maintained;
        tracking the movement of the shape to produce the curve; and
    generating a planar-connected graph by connecting at least portions of the plural curves, wherein the planar-connected graph corresponds to the road network.

2. The method of claim 1, wherein the satellite imagery corresponds to a single satellite image or a blend of multiple satellite images.

3. The method of claim 1, wherein the positioning comprises positioning the shape on the grayscale image so that the average intensity of the grayscale image covered by the shape is maximized.

4. The method of claim 1, wherein the producing of each curve further comprises blacking out the tracked movement of the shape corresponding to the curve within the grayscale image.

5. The method of claim 1, wherein the shape is a rectangle.

6. The method of claim 1, wherein the planar-connected graph is maintained within a spatial database which defines the geometries for the plural curves.

7. The method of claim 6, wherein the generating comprises, for a curve within the plural curves:
    determining if an endpoint of the curve is within a predetermined distance of an edge another curve within the planar-connected graph, based on the geometries defined within the spatial database; and
    if it is determined that the endpoint is within the predetermined distance to the edge,
        connecting the curve to the edge, and
        storing the connection in the spatial database.

8. The method of claim 6, wherein the generating comprises, for a curve within the plural curves:
    determining if the curve intersects another curve within the planar-connected graph, based on the geometries defined within the spatial database; and
    if it is determined that the curve intersects the other curve,
        splitting the curve at a point corresponding to the intersection, and
        storing the split in the spatial database.

9. The method of claim 8, further comprising:
    if it is determined that the curve does not intersect the other curve,
        storing the curve in the spatial database.

10. The method of claim 8, wherein the determining comprises performing a Manhattan distance calculation using the curve and the other curve to determine if the curve intersects the other curve.

11. The method of claim 1, wherein the planar-connected graph corresponds to a first region, the method further comprising:
    connecting the planar-connected graph with another planar-connected graph corresponding to a second region which is different from the first region.

12. A system for generating a road network based on satellite imagery, the system comprising:
    one or more processors; and
    a machine-readable medium comprising instructions stored therein, which when executed by the processors, cause the processors to perform operations comprising:
        obtaining plural pixels corresponding to satellite imagery of a region;
        calculating, for each of the plural pixels, a probability value corresponding to the probability that the pixel belongs within the road network;
        forming a grayscale image based on the calculated probability values;
        producing plural curves based on the grayscale image, wherein the producing of each curve comprises:
            positioning a shape on the grayscale image so that the average intensity of the grayscale image covered by the shape is maximized;
            moving the shape about the grayscale image while the average intensity is maintained;
            tracking the movement of the shape to produce the curve; and
        generating a planar-connected graph by connecting at least portions of the plural curves, wherein the planar-connected graph corresponds to the road network.

13. The system of claim 12, wherein the producing of each curve further comprises blacking out the tracked movement of the shape corresponding to the curve within the grayscale image.

14. The system of claim 12, wherein the shape is a rectangle.

15. The system of claim 12, wherein the planar-connected graph is maintained within a spatial database which defines the geometries for the plural curves.

16. The system of claim 15, wherein the generating comprises, for a curve within the plural curves:
    determining if an endpoint of the curve is within a predetermined distance of an edge another curve within the planar-connected graph, based on the geometries defined within the spatial database; and if it is determined that the endpoint is within the predetermined distance to the edge,
connecting the curve to the edge, and
storing the connection in the spatial database.

17. The system of claim 15, wherein the generating comprises, for a curve within the plural curves:
determining if the curve intersects another curve within the planar-connected graph, based on the geometries defined within the spatial database; and
if it is determined that the curve intersects the other curve,
splitting the curve at a point corresponding to the intersection, and
storing the split in the spatial database.

18. The system of claim 17, the operations further comprising:
if it is determined that the curve does not intersect the other curve,
storing the curve in the spatial database.

19. The system of claim 17, wherein the determining comprises performing a Manhattan distance calculation using the curve and the other curve to determine if the curve intersects the other curve.

20. The system of claim 12, wherein the planar-connected graph corresponds to a first region, the operations further comprising:
connecting the planar-connected graph with another planar-connected graph corresponding to a second region which is different from the first region.

21. A non-transitory computer readable storage medium comprising instructions stored therein, which when executed by a system, cause the system to perform operations comprising:
obtaining plural pixels corresponding to satellite imagery of a region;
calculating, for each of the plural pixels, a probability value corresponding to the probability that the pixel belongs within the road network;
forming a grayscale image based on the calculated probability values;
producing plural curves based on the grayscale image, wherein the producing of each curve comprises:
positioning a rectangle on the grayscale image so that an average intensity of the grayscale image covered by the rectangle exceeds a preset threshold;
moving the rectangle about the grayscale image while the average intensity is maintained;
tracking the movement of the rectangle to produce the curve;
blacking out the tracked movement of the rectangle corresponding to the curve within the grayscale image; and
generating a planar-connected graph by connecting at least portions of the plural curves, wherein the planar-connected graph corresponds to the road network.

* * * * *